(12) United States Patent
Carter

(10) Patent No.: US 8,641,056 B1
(45) Date of Patent: Feb. 4, 2014

(54) SHOULDER-CARRIABLE WHEELED CART ASSEMBLY

(71) Applicant: Robert L. Carter, Naperville, IL (US)

(72) Inventor: Robert L. Carter, Naperville, IL (US)

( * ) Notice: Subject to any disclaimer, the term of this patent is extended or adjusted under 35 U.S.C. 154(b) by 0 days.

(21) Appl. No.: 13/797,973

(22) Filed: Mar. 12, 2013

(51) Int. Cl.
*B62B 1/04* (2006.01)

(52) U.S. Cl.
USPC .................. 280/30; 280/652; 280/47.18

(58) Field of Classification Search
USPC ............. 280/30, 47.131, 47.17, 47.18, 47.19, 280/47.26, 47.27, 47.28, 47.29, 651, 652; 190/18 A; 224/153
See application file for complete search history.

(56) References Cited

U.S. PATENT DOCUMENTS

| | | | |
|---|---|---|---|
| 493,348 A | | 3/1893 | Barry et al. |
| 2,128,174 A | | 8/1938 | Smith |
| 2,143,065 A | | 1/1939 | Glenny |
| 2,327,537 A | | 8/1943 | Lyman |
| 2,401,986 A | | 6/1946 | Talbott |
| 2,436,991 A | * | 3/1948 | Dirksen ................. 224/415 |
| 2,457,624 A | | 12/1948 | Alerks |
| 2,498,446 A | | 2/1950 | Pawsat |
| 2,700,493 A | | 1/1955 | Meier |
| 3,144,014 A | * | 8/1964 | Mantell, Jr. ............. 126/38 |
| 3,348,857 A | * | 10/1967 | Rollin .................... 280/654 |
| 3,517,867 A | | 6/1970 | Fritz et al. |
| 3,550,997 A | | 12/1970 | Strand et al. |
| 3,560,015 A | | 2/1971 | Tracy et al. |
| 3,603,549 A | | 9/1971 | Brilando et al. |
| 3,786,972 A | | 1/1974 | Alley |
| 3,865,392 A | * | 2/1975 | Hartway ................. 280/35 |
| 3,873,127 A | | 3/1975 | McNichol, Jr. et al. |
| 3,938,718 A | | 2/1976 | Madison |
| 4,056,219 A | | 11/1977 | Hine, Jr. |
| 4,282,993 A | | 8/1981 | Humlong |

(Continued)

FOREIGN PATENT DOCUMENTS

| | | |
|---|---|---|
| GB | 2220628 | 1/1990 |
| GB | 2408195 | 5/2005 |

(Continued)

OTHER PUBLICATIONS

Austin, Tyrill, "Guide to Folding Utility Cart", ArticleSnatch.com, Undated (http://www.articlesnatch.com/Article/Guide-To-Folding-Utility-Cart-/3399134).

(Continued)

*Primary Examiner* — John R Olszewski
*Assistant Examiner* — Brodie Follman
(74) *Attorney, Agent, or Firm* — Corridor Law Group, P.C.

(57) ABSTRACT

A shoulder-carriable wheeled cart assembly includes a cart frame, a detachable backpack mountable on the cart frame, a plurality of laterally spaced support pegs mounted on the cart frame lower end portion, and a detachable harness strap. The harness strap is tightenable about articles mounted on the support pegs between the harness strap and the cart frame to secure said articles against the cart frame. A support tray attachable to the support pegs and interposable between the articles and the support pegs stabilizes the mounting of the articles on the support pegs. The cart assembly is mountable on a mobile passenger vehicle, such as a bicycle, via a docking fixture that receives and secures the cart assembly. A retraction cord connected to the harness strap upper end urges the harness strap upper end toward the upper portion of the frame, thereby avoiding dragging the harness strap along the ground.

13 Claims, 18 Drawing Sheets

(56) References Cited

U.S. PATENT DOCUMENTS

| | | | | |
|---|---|---|---|---|
| 4,362,307 A * | 12/1982 | Nakatani | | 280/30 |
| 4,368,835 A * | 1/1983 | Murphy | | 224/153 |
| 4,433,802 A * | 2/1984 | Woolf | | 224/153 |
| 4,440,332 A | 4/1984 | Kullen | | |
| 4,444,405 A | 4/1984 | Barrus | | |
| 4,491,258 A | 1/1985 | Jones | | |
| 4,566,617 A | 1/1986 | Jackson | | |
| 4,570,958 A * | 2/1986 | Walker | | 280/40 |
| 4,593,841 A * | 6/1986 | Lange | | 224/153 |
| 4,638,933 A | 1/1987 | Boufford | | |
| 4,869,408 A | 9/1989 | Lutz | | |
| 5,005,844 A * | 4/1991 | Douglas et al. | | 280/1.5 |
| 5,118,130 A * | 6/1992 | Kaltz | | 280/654 |
| RE34,474 E | 12/1993 | Lutz | | |
| 5,460,307 A | 10/1995 | Stevenson | | |
| 5,564,720 A * | 10/1996 | Stringer | | 280/30 |
| 5,573,163 A | 11/1996 | Lee et al. | | |
| 5,634,576 A | 6/1997 | Arbel | | |
| 5,730,264 A * | 3/1998 | Lu | | 190/108 |
| 5,743,447 A | 4/1998 | McDermott | | |
| 5,769,431 A * | 6/1998 | Cordova | | 280/1.5 |
| 5,791,670 A | 8/1998 | Hunker | | |
| 5,806,740 A | 9/1998 | Carlson | | |
| 5,863,055 A * | 1/1999 | Kasravi et al. | | 280/47.29 |
| D406,942 S * | 3/1999 | Santoro | | D3/216 |
| 5,931,361 A | 8/1999 | Schwimmer | | |
| 5,954,253 A | 9/1999 | Swetish | | |
| 5,964,470 A * | 10/1999 | Syendsen et al. | | 280/30 |
| 6,012,729 A * | 1/2000 | Lin | | 280/47.18 |
| 6,045,021 A | 4/2000 | Stites | | |
| 6,161,739 A * | 12/2000 | Bentzen | | 224/153 |
| 6,357,784 B1 * | 3/2002 | Mitzman | | 280/642 |
| 6,367,821 B2 * | 4/2002 | Thiele | | 280/30 |
| 6,374,524 B1 * | 4/2002 | Capps | | 40/612 |
| 6,561,395 B2 * | 5/2003 | Lim et al. | | 224/261 |
| 7,036,641 B2 * | 5/2006 | Russo et al. | | 190/18 A |
| 7,111,851 B2 * | 9/2006 | Duncan | | 280/47.26 |
| 7,143,912 B2 * | 12/2006 | Caneba | | 224/153 |
| 7,273,221 B2 * | 9/2007 | Ockenden | | 280/288.4 |
| 7,293,792 B2 * | 11/2007 | Wilson | | 280/647 |
| 7,387,304 B1 * | 6/2008 | Rich et al. | | 280/47.131 |
| 7,389,997 B2 * | 6/2008 | Johnson et al. | | 280/47.19 |
| 7,431,311 B2 * | 10/2008 | Turner et al. | | 280/30 |
| 7,597,341 B2 * | 10/2009 | Russo | | 280/655.1 |
| 7,857,328 B1 * | 12/2010 | Boss | | 280/47.25 |
| 8,070,182 B2 * | 12/2011 | Wang et al. | | 280/655 |
| 8,317,219 B2 * | 11/2012 | Bruce | | 280/651 |
| 8,322,583 B2 | 12/2012 | Crum et al. | | |
| 8,454,031 B2 * | 6/2013 | Turner et al. | | 280/30 |
| 2004/0108350 A1 * | 6/2004 | Warren | | 224/633 |
| 2004/0129602 A1 * | 7/2004 | Sapyta et al. | | 206/748 |
| 2004/0130112 A1 * | 7/2004 | Doyle | | 280/47.26 |
| 2004/0144606 A1 * | 7/2004 | Han | | 190/18 A |
| 2004/0238303 A1 * | 12/2004 | Hafif | | 190/18 A |
| 2005/0103589 A1 * | 5/2005 | Russo et al. | | 190/18 A |
| 2006/0006618 A1 * | 1/2006 | Duncan | | 280/47.26 |
| 2006/0119057 A1 * | 6/2006 | Russo | | 280/47.18 |
| 2009/0079144 A1 * | 3/2009 | Satorius | | 280/1.5 |
| 2010/0327562 A1 * | 12/2010 | Kasuya et al. | | 280/651 |
| 2012/0126499 A1 * | 5/2012 | Nieman | | 280/30 |
| 2012/0325607 A1 * | 12/2012 | Webster et al. | | 190/115 |
| 2013/0062387 A1 * | 3/2013 | Gleason, Jr. | | 224/633 |

FOREIGN PATENT DOCUMENTS

| | | |
|---|---|---|
| WO | 9725896 | 7/1997 |
| WO | 9749312 | 12/1997 |
| WO | 0164071 | 9/2001 |

OTHER PUBLICATIONS

Carr, Wesley, "Make Shopping Convenient With Shopping Carts", EzineMark.com, Jan. 10, 2011 (http://shopping-cart.ezinemark.com/make-shopping-convenient-with-shopping-carts-31dc462b0bf.html).

Khan, Farooq, "Best Shopping Cart New Buyer's Guidebook", ArticleSnatch.com, Undated (http://www.articlesnatch.com/Article/Best-Shopping-Cart-New-Buyer-s-Guidebook/3536922).

Moore, Christopher, "Buying a Folding Shopping Cart That Is Just Right for You", ABCArticleDirectory.com Oct. 8, 2010 (http://www.abcarticledirectory.com/Article/Buying-A-Folding-Shopping-Cart-That-Is-Just-RIght-For-You/1028709).

Moore, Christopher, "Folding Shopping Cart Tips—Find out more about how to get a folding shopping cart", GoArticles.com, Oct. 8, 2010 (http://goarticles.com/article/Folding-Shopping-Cart-tips-Find-out-more-About-How-to-Get-A-Folding-Shopping-Cart/3448683).

Moore, Christopher, "How to Choose a Folding Shopping Cart", EzineMark.com, Oct. 7, 2010 (http://shopping.ezinemark.com/how-to-choose-a-folding-shopping-cart-55e3db32a10.html).

Moore, Christopher, "How to Choose a Folding Shopping Cart That Is Just Made for You", SooperArticles.com Oct. 18, 2010 (http://www.sooperarticles.com/shopping-articles/how-choose-folding-shopping-cart-just-made-you-178624.html).

Pinker, Jerry, "Folding Shopping Cart Product Review—How to find a shopping cart that is just right for you", Ezine Articles, Oct. 8, 2010 (http://ezinearticles.com/?Folding-Shopping-Cart-Product-Review---How-to-Find-a-ShoppingCart-That-ls-Just-Right-For-You&id=5135021).

Pinker, Jerry, "Folding Shopping Carts: Shop With Satisfaction", Ezine Articles, Dec. 10, 2010 (http://ezinearticles.com/?Folding-Shopping-Carts:-Shop-With-Satisfaction&id=5455337).

Pinker, Jerry, "Moving Without Much Effort: Folding Utility Cart", Ezine Articles, Dec. 2, 2010 (http://ezinearticles.com/?Moving-Without-Much-Effort:-Folding-Utility-Cart&id=5455351).

Saucier, Steve, "Best Folding Shopping Carts", Ezine Articles Feb. 11, 2011 (http://ezinearticles.com/?Best-Folding-Shopping-Carts&id=5859571).

Scheers, Jason, "Rolling Utility Cart—Put Some Wheels Under That Load", Ezine Articles, Dec. 11, 2010 (http://ezinearticles.com/?Rolling-Utility-Cart---Put-Some-Wheels-Under-That-Load&id=5536997).

Schwenk, Martin, "How to Get a Good Folding Shopping Cart for You", ABCArticleDirectory.com, Oct. 18, 2010 (http://www.abcarticledirectory.com/Article/How-To-Get-A-Good-Folding-Shopping-Cart-For-You/1041213).

Swonson, Patrick, "Just How Folding Shopping Carts Are Helping the Elderly to Be Active Outside the Home" ArticleSnatch.com, Undated (http://www.articlesnatch.com/Article/Just-How-Folding-Shopping-Carts-Are-Helping-The-Elderly-To-Be-Active-Outside-The-Home/1991892).

Webster. Milo, "Folding Shopping Carts — How Do They Benefit Your Shopping Experience", TheBestHomeInfo.com Feb. 19, 2013 (http://www.thebesthomeinfo.com/folding-shopping-carts-how-do-they-benefit-your-shopping-experience-3986049).

Wrighter, Stewart, "All About Portable Carts", ArticleSnatch.com, Undated (http://www.articlesnatch.com/Article/All-About-Portable-Carts/2715741).

Wrighter, Stewart, "Great Uses of Folding Carts", ABCArticleDirectory.com, Jan. 5, 2012 (http://www.abcarticledirectory.com/Article/Great-Uses-of-Folding-Carts/1531869).

Wrighter, Stewart, "Great Uses of Folding Carts", ArticleSnatch.com, Oct. 27, 2010 (http://ezinearticles.com/?Great-Uses-Of-Folding-Carts&id=5281930).

Wrighter, Stewart, "Here Are Some Options If You Are Looking for Portable Carts", ArticleSnatch.com, Undated (http://www.articlesnatch.com/Article/Here-Are-Some-Options-If-You-Are-Looking-For-Portable-Carts/3015386#.UU_IhjckTXo).

Wrighter, Stewart, "How to Make Transporting Shopping Items Easier", ArticleSnatch.com, Undated (http://www.articlesnatch.com/Article/How-To-Make-Transporting-Shopping-Items-Easier/2388590).

* cited by examiner

SHOULDER-CARRIABLE WHEELED CART ASSEMBLY

FIELD OF THE INVENTION

The present invention relates to wheeled carriers. More specifically, the present invention relates to a shoulder-carriable wheeled cart assembly, and in particular a shoulder-carriable wheeled cart assembly having extendable foot members on the back side of the cart frame that, when combined with the associated tray and detachable, adjustable backpack harness straps, allows for additional carrying capacity. The shoulder-carriable wheeled cart assembly can be attached to a mobile passenger vehicle such as a bicycle or moped.

BACKGROUND OF THE INVENTION

Throughout time there has been a real need for people to find a way to functionally transport heavy bulky items easily without undue stress upon the user's body. Backpacks allow users to carry a pre-determined heavy or bulky article load without undue stress upon their own skeletal structure. Heavier weight or bulk than can be comfortably or safely carried upon one's back have been placed upon wheeled carts or dollies thus allowing the wheels to transfer the weight of the load directly to the ground surface and sparing the user from physically carrying such weight or bulk. Combination shoulder-carrying wheeled cart frame assemblies have been used for years to give the user both options of carrying or wheeling heavy or bulky articles within one device. These devices have been limited to carrying heavy or bulky articles on the front side of the wheeled cart frame in the form of an attachable bag or directly upon the wheeled cart frame itself functioning as a wheeled dolly. Use of the back side of the wheeled cart frame for additional carrying capacity is a function lacking in prior art devices.

When being used as a wheeled cart without a back side frame load, the backpack harness straps will hang limp, and there is a need to manage the frame attached backpack harness straps so they do not drag on the ground when the wheeled cart is being pulled. There has not been exhibited a method to provide for such management of the harness straps.

There are times when the user might want to attach a shoulder-carriable wheeled cart assembly to a mobile passenger vehicle such as a bicycle or moped. There are prior art devices for attaching backpacks, carry bags, baskets, and shoulder-carriable wheeled cart frames to mobile passenger vehicles. The present design attaches and secures a shoulder-carriable wheeled cart assembly to such mobile passenger vehicle, which is a capability lacking in prior art devices.

There are many prior art devices that include the functional elements of a shoulder-carriable wheeled cart assembly. Such shoulder-carriable wheeled cart assemblies include detachable and adjustable backpack harness straps that the user can wear over their shoulders and carry such device as a backpack. They also include the ability to set such shoulder-carriable wheeled cart frame assemblies on the ground and extending a pull handle thus creating the ability to pull such cart assembly behind the user allowing the shoulder-carriable wheeled cart assembly to support the heavy or bulky articles placed into or upon the cart. Wheels for such cart assemblies have been exhibited as permanently affixed, foldable, or detachably mounted to such cart frame. A bag can be fastened to the front side of the wheeled cart frame thus having the frame function as an external backpack frame or the bag can be removed and the wheeled frame can function as a utility dolly.

Lacking among prior art devices is the ability to secure additional objects to the back side of the shoulder-carriable wheeled cart assembly for additional carrying capacity. Prior devices include an attached bag fastened to the front side of the frame, or the bare frame itself being used as a utility dolly. Also lacking among prior art devices is a mechanism for managing the backpack harness straps so as to keep them off the ground when the device is being used as a rolling cart. Prior art devices also lack the ability to be easily and securely mounted attached to a mobile passenger vehicle.

Exemplary prior art devices include those disclosed in Cahill U.S. Pat. No. 493,348, Talbott U.S. Pat. No. 2,401,986, Strand U.S. Pat. No. 3,550,997, Nakatani U.S. Pat. No. 4,362,307, Caneba U.S. Pat. No. 7,143,912, Brilando U.S. Pat. No. 3,603,549, Humlong U.S. Pat. No. 4,282,993, Lyman U.S. Pat. No. 2,327,537, Alerks U.S. Pat. No. 2,457,624, Tracy U.S. Pat. No. 3,560,015, Hine U.S. Pat. No. 4,056,219, Murphy U.S. Pat. No. 4,368,835, Kullen U.S. Pat. No. 4,440,332, Lange U.S. Pat. No. 4,593,841, Buofford U.S. Pat. No. 4,638,933, Stevenson U.S. Pat. No. 5,460,307, Russo U.S. Pat. No. 7,597,341, Smith U.S. Pat. No. 2,128,174, Glenny U.S. Pat. No. 2,143,065, Pawsat U.S. Pat. No. 2,498,446, Meier U.S. Pat. No. 2,700,493, Fritz U.S. Pat. No. 3,517,867, Ockenden U.S. Pat. No. 7,273,221, and Crum U.S. Pat. No. 8,322,583.

The present shoulder-carriable wheeled cart assembly overcomes shortcomings and limitations of related prior art devices by providing the ability to carry additional articles in a simple and convenient manner. The present shoulder-carriable wheeled cart assembly also provides the ability to manage backpack harness straps so they don't drag on the ground when the shoulder-carriable wheeled cart assembly is being used in pull cart mode. The present shoulder-carriable wheeled cart assembly also provides the ability to easily and securely mount attach the assembly to a mobile passenger vehicle such as a bicycle.

The capacity to carry one or more heavy, bulky articles is provided at the back side of the shoulder-carriable wheeled cart assembly by the addition of two foldable or detachable support pegs that extend substantially perpendicularly from the back side of the frame. A detachable support tray that spans the support pegs provides a shelf-like surface upon which the additional heavy or bulky article(s) rest. If the articles to be carried are of suitable size and weight, they could be supported by the pegs alone. The detachable adjustable backpack harness straps adjustably tighten around the article(s) to secure them between and against the back side of the frame and to also secure the article(s) atop the bridged support tray or pegs alone, thereby preventing the article(s) from falling or slipping off the support tray or pegs.

When using the shoulder-carriable wheeled cart assembly without a back side frame load and as a pull cart with the handle extended, the harness straps are pulled up and kept off the ground with a self-retracting strap. In one embodiment, the retraction strap is an elastic strap that is looped around the backpack harness straps and attached to the telescoping handle. When the handle is extended, the looped self-retracting strap elastic strap provides tension and pulls the detachable adjustable backpack harness straps upward, thereby preventing slack in the harness straps that would allow them to drag on the ground when the cart is being pulled.

The user of the shoulder-carriable wheeled cart assembly may wish to attach the device to a mobile passenger vehicle such as a bicycle or moped. The present device provides a way of securing the shoulder-carriable wheeled frame assembly to a mobile passenger vehicle. A mobile passenger vehicle docking fixture securely attaches to a mobile passenger vehicle, such as a bicycle or moped, and receives and secures the shoulder-carriable wheeled cart assembly frame bottom cross member to the bottom horizontal structure of the rigid "L" shaped docking fixture. An adjustable "U" channel shaped receptacle bar attached sideways across and to the docking fixture bottom horizontal structure of the docking fixture receives the shoulder-carriable wheeled cart frame bottom cross member. This allows the weight of the articles loaded onto the shoulder-carriable wheeled cart assembly to be supported on the docking fixture, which is securely mounted to the mobile passenger vehicle. The bar and channel receptacle attachment method secures the bottom end of the cart frame and prevents the frame from slipping forwards or backwards on the docking fixture. The bottom surface of the shoulder-carriable wheeled cart frame bottom cross member has 2 spaced stop pegs extending perpendicular from the bottom surface that straddle the "U" channel shaped receptacle bar end to end, stop pegs positioned directly at docking fixture receptacle bar ends. Using this blocking method eliminates side to side movement of the cart frame bottom cross member within the docking fixture. The shoulder-carriable wheeled cart frame bottom cross member can be securely latched into the "U" channel shaped receptacle bar. Both spring tension and mechanical methods of pinning or containing and releasing the frame bottom cross member to and from the "U" channel shaped docking fixture receptacle bar. The "U" channel shaped receptacle bar is adjustable forwards and backwards on the bottom horizontal structure of the docking fixture. The mated and secured assembly formed between the cart frame, the docking fixture and the releasable latching mechanism limits vertical movement of the shoulder-carriable wheeled cart frame within the docking fixture receptacle bar slot. The cart frame is thereby prevented from becoming detached from the docking fixture if the mobile passenger vehicle hits a bump or otherwise experiences up and down motion. When mounted on a bicycle, the upper portion of the shoulder-carriable wheeled cart assembly is preferably secured to the bicycle handle bars by a detachable self-retracting strap elastic cord that limits forward travel of the upper portion of the cart assembly under braking conditions.

SUMMARY OF THE INVENTION

In one embodiment, an improved shoulder-carriable wheeled cart assembly comprises:
(a) a cart frame having an upper end portion and a lower end portion, the frame lower end portion having a pair of wheels mounted thereon and a foldable shelf member extendable laterally from one side thereof, the cart frame having arranged thereon a plurality of spaced first cooperative attachment members;
(b) a detachable backpack mountable on the one side of the cart frame, the backpack having an interior storage volume and an exterior surface, the exterior surface having arranged thereon a plurality of spaced second cooperative attachment members, each of the second cooperative attachment members aligned with, attachable to and detachable from a corresponding first cooperative attachment member on the cart frame, the backpack supportable on the shelf member when the shelf member is in a laterally extended position;
(c) a plurality of laterally spaced support pegs mounted on the cart frame lower end portion, the support pegs extending away from the other side of the cart frame,
(d) a detachable harness strap extending from the other side of the cart frame, the harness strap having an upper end and a lower end, the harness strap upper end attachable to and detachable from the cart frame upper end portion, the harness strap lower end attachable to and detachable from the cart frame lower end portion, the harness strap tightenable about articles mounted on the support pegs between the harness strap and the cart frame to secure the articles against the cart frame other side.

A preferred embodiment of the wheeled cart assembly further comprises a second detachable harness strap extending from the cart frame. The second harness strap has an upper end and a lower end. The second harness strap upper end is attachable to and detachable from the cart frame upper end portion. The second harness strap lower end is attachable to and detachable from the cart frame lower end portion. The second harness strap is tightenable about articles mounted on the support pegs between the second harness strap and the cart frame to secure the articles against the cart frame other side.

In a preferred embodiment of the wheeled cart assembly, the wheels can be detachably mounted on the cart frame. The wheels can also be foldably mounted on the cart frame.

In a preferred embodiment of the wheeled cart assembly, the support pegs can be detachably mounted on the cart frame lower end portion. The support pegs can also be foldably mounted on the cart frame lower end portion.

A preferred embodiment of the wheeled cart assembly further comprises a support tray attachable to the support pegs and interposable between the articles and the support pegs, such that the support tray stabilizes the mounting of the articles on the support pegs. The support tray preferably has a plurality of channels formed therein, each of the channels aligned with, attachable to and detachable from a corresponding support peg. The assembly can further comprise a retraction cord having a first portion attached to the handle and a second portion operatively connected to the strap upper end, such that the retraction cord urges the strap upper end toward the handle.

In a preferred embodiment of the wheeled cart assembly, the cooperative attachment members snap together. A foldable foot member is preferably extendable downwardly from the shelf member.

In one embodiment, a shoulder-carriable wheeled cart assembly is mountable on a mobile passenger vehicle having a frame comprising a wheel axle. The mountable assembly comprises:
(a) a docking fixture mountable at an upper end of the vehicle frame such that the wheel axle supports the docking fixture, the docking fixture comprising a receiving member having a channel formed therein;
(b) a backpack frame having an upper end portion and a lower end portion supportable on the docking fixture, the backpack frame lower end portion having a pair of wheels mounted thereon and a foldable shelf member extendable laterally therefrom, the frame lower end portion comprising an insertable member retainable within the receiving member channel;
(c) a detachable backpack mountable on one side of the backpack frame, the backpack having an interior storage volume and an exterior surface, the backpack supportable on the shelf member when the shelf member is in a laterally extended position,
(d) a detachable harness strap extending from the other side of the frame, the harness strap having an upper end and a lower end, the harness strap upper end attachable to and detachable from the frame upper end portion, the harness strap lower end attachable to and detachable from the frame lower end portion, the harness strap tightenable about articles mounted on the support pegs between the harness strap and the frame to secure the articles against the frame other side.

In a preferred embodiment of the mountable wheeled cart assembly, the mobile passenger vehicle is a bicycle. The wheel axle is preferably a front wheel axle. The docking fixture preferably comprises a vertical member and a lateral member extending from the vertical member; the vertical member mountable at an upper end of the vehicle frame, the lateral member mountable on the vehicle frame such that the wheel axle supports the docking fixture, the lateral member comprising the receiving member.

In a preferred embodiment, the mountable wheeled cart assembly further comprises a retention mechanism for retaining the insertable member within the receiving member channel. The retention mechanism is preferably selected from the group comprising a detent mechanism and a slidable closure mechanism for retaining the insertable member within the receiving member channel.

In one embodiment, a shoulder-carriable wheeled cart assembly comprises:
 (a) a cart frame having an upper end portion and a lower end portion, the frame lower end portion having a pair of wheels mounted thereon and a foldable shelf member extendable laterally from one side thereof, the cart frame having arranged thereon a plurality of spaced first cooperative attachment members;
 (b) a detachable backpack mountable on the one side of the cart frame, the backpack having an interior storage volume and an exterior surface, the exterior surface having arranged thereon a plurality of spaced second cooperative attachment members, each of the second cooperative attachment members aligned with, attachable to and detachable from a corresponding first cooperative attachment member on the cart frame, the backpack supportable on the shelf member when the shelf member is in a laterally extended position;
 (c) a plurality of laterally spaced support pegs mounted on the cart frame lower end portion, the support pegs extending away from the other side of the cart frame,
 (d) an upwardly extendable handle from the cart frame upper end portion
 (e) at least one detachable harness strap extending from the other side of the cart frame, the at least one harness strap having an upper end and a lower end, the at least one harness strap upper end attachable to and detachable from the cart frame upper end portion, the at least one harness strap lower end attachable to and detachable from the cart frame lower end portion, the at least one harness strap tightenable about articles mounted on the support pegs between the at least one harness strap and the cart frame to secure the articles against the cart frame other side;
 (f) a retraction cord having a first portion attached to the handle and a second portion operatively connected to the at least one harness strap upper end, whereby the retraction cord urges the at least one harness strap upper end toward the handle.

In a preferred embodiment of the foregoing wheeled cart assembly, the at least one harness strap comprises two harness straps. The harness straps preferably converge at the straps upper ends to form a unitary strap portion. The unitary strap portion is attachable to and detachable from the cart frame upper end portion. The strap lower ends are attachable to and detachable from the cart frame lower end portion.

DETAILED DESCRIPTION OF PREFERRED EMBODIMENT(S)

Figure 1:
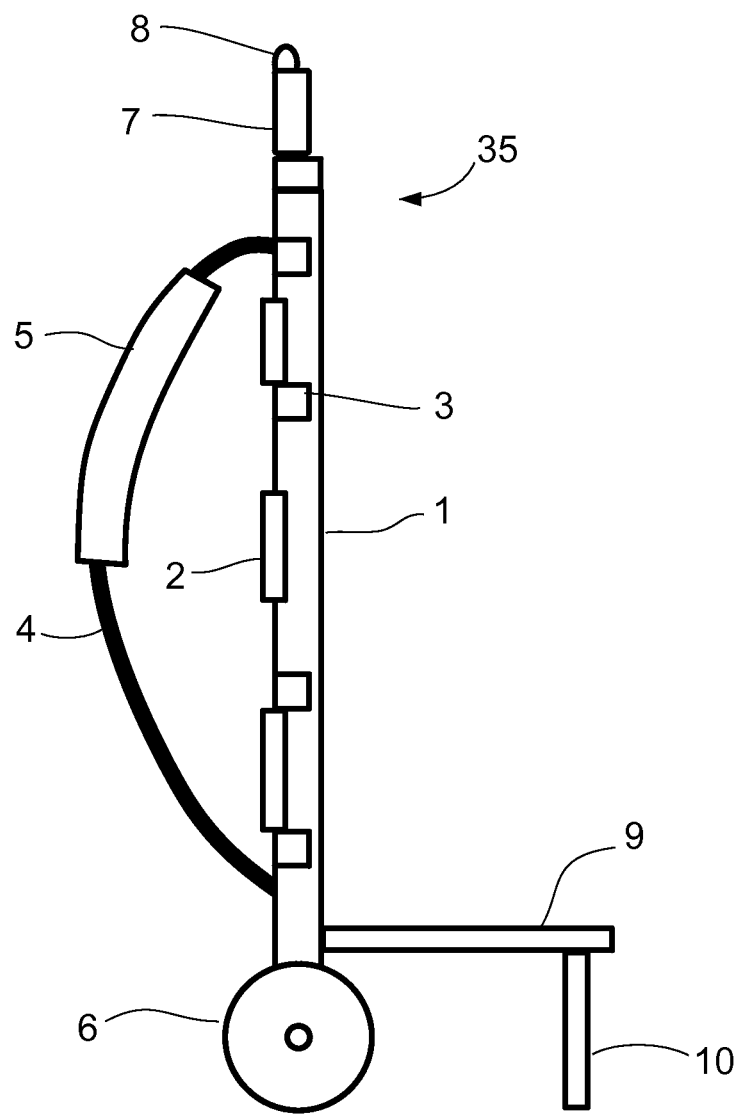
FIG. 1 is a side elevation view of the shoulder-carriable wheeled cart assembly with the lateral-extending shelf member in the open, unfolded position.

Turning first to FIG. 1, is a side view of the shoulder-carriable wheeled cart assembly 35. It is made up of a frame upright 1, adjustable back support straps 2 that stretch between frame uprights and provide cushion to wearer. Bag attachment connectors 3 snap together with connectors attached to the backpack bag to secure backpack bag to shoulder-carriable wheeled cart assembly. Cart assembly 35 includes a detachable adjustable backpack harness strap 4 and backpack harness strap padding 5.

Although wheel 6 is shown as a fixed component in FIG. 1 and subsequent drawings, wheel 6 could also be detachable or folding by rotating 90 degrees or more about the bottom end of the cart frame, thus placing the wheels partially beneath folding support platform 9. An extendable telescoping handle 7 atop the cart assembly 35 has a handle release button 8 that locks the handle in the closed or extended position. Foldable laterally-extending shelf member 9 and support leg 10 are shown in the open or extended position ready to support heavy or bulky articles.

Figure 2:
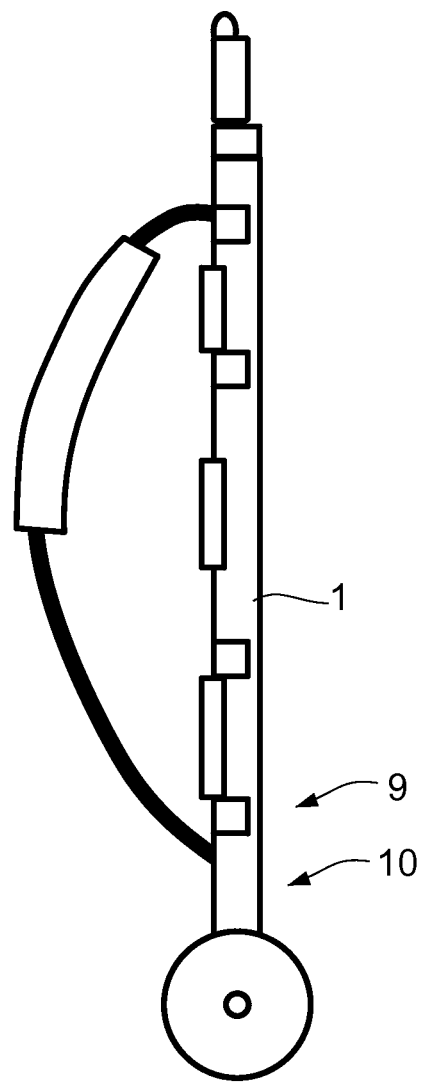
FIG. 2 is a side elevation view of the shoulder-carriable wheeled cart assembly the lateral-extending shelf member in the closed, folded position.

FIG. 2 shows cart assembly 35 with foldable shelf member 9 and support leg 10 in the closed position.

Figure 3:
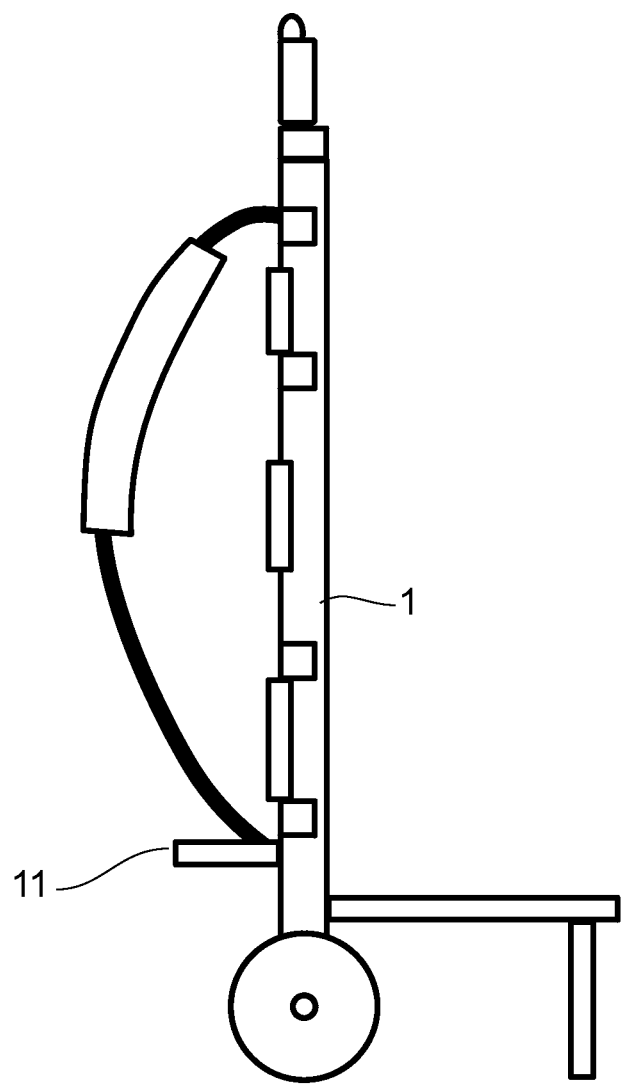
FIG. 3 is a side elevation view of the shoulder-carriable wheeled cart assembly with support peg extended.

FIG. 3 shows a support peg 11 that is used for holding up or supporting weighty or bulky articles that can be attached to the back of the frame 1. Removable support peg 11 shown in these drawings is inserted into preformed holes in the back edge at the lower end portion of frame 1. Support peg 11 could also be foldable against or otherwise attached to frame 1.

Figure 4:
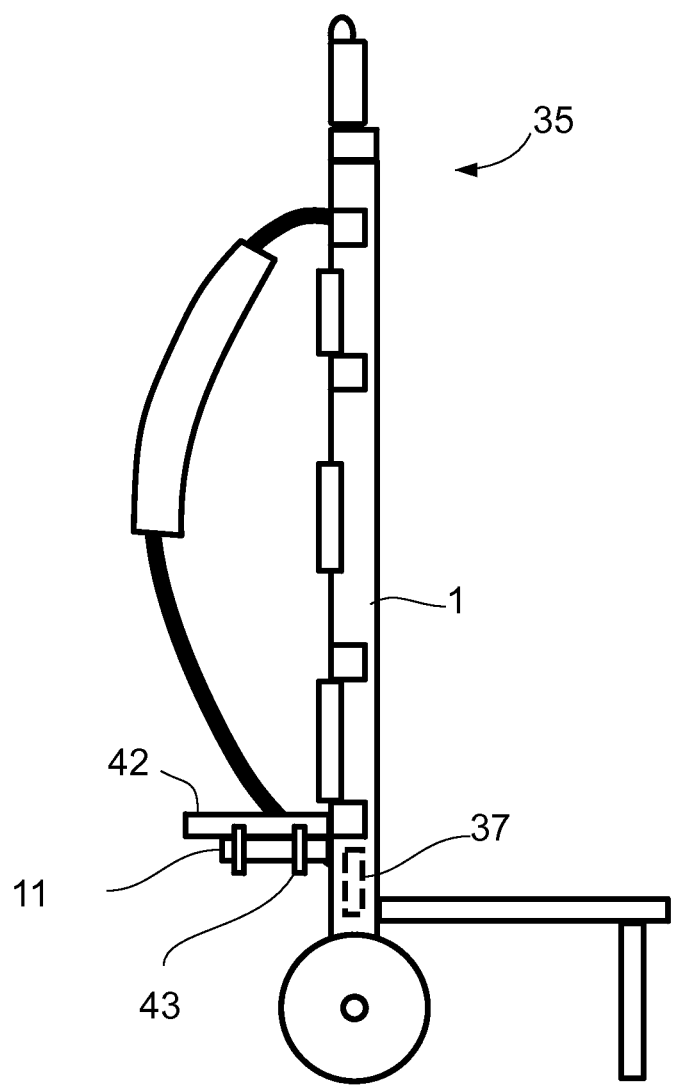
FIG. 4 is a side elevation view of the shoulder-carriable wheeled cart assembly with support peg extended and detachable support tray attached.

FIG. 4 shows the addition to cart assembly 35 of a detachable support tray 42. Support tray 42 attaches to support peg 11 preferably via tray snaps 43 that lockingly snap onto support peg 11. A hidden end view locates the bottom frame cross member 37.

Figure 5:
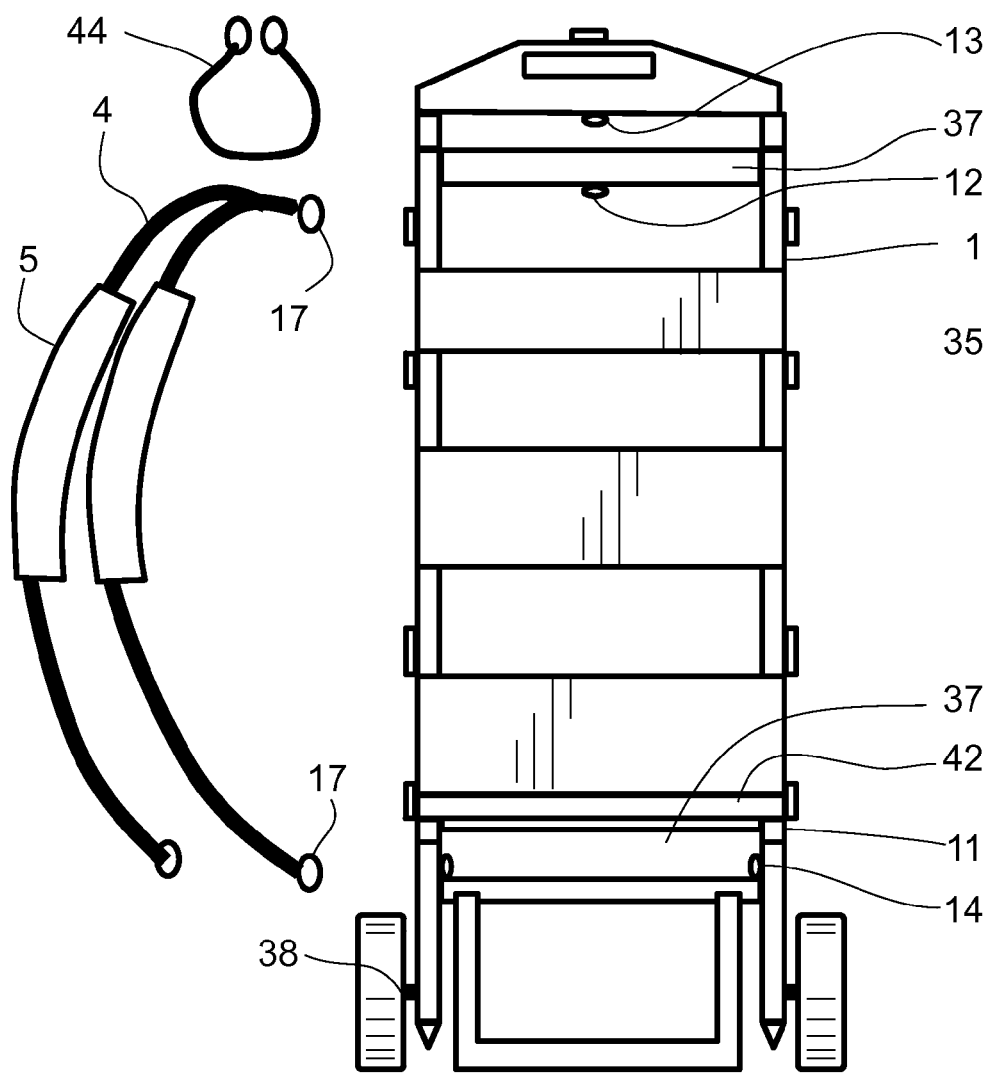
FIG. 5 is a rear elevation view of the shoulder-carriable wheeled cart assembly with the adjustable backpack harness straps and retractable cord detached.

FIG. 5 is a rear view of the shoulder-carriable wheeled cart assembly 35, with detachable adjustable backpack harness straps 4 with padding 5 and retraction cord 44 disconnected from the frame assembly. Backpack harness fastening rings 17 allow easy attachment to cart assembly 35. Cart frame harness fastening ring 12 and the lower frame harness fastening rings 14 connect with the backpack harness fastening rings 17. The telescoping handle harness fastening ring 13 is the connection point for the two ends of retraction cord 44. Also shown are top and bottom frame cross members 37 that extend side to side and attach to frame uprights 1 giving shoulder-carriable wheeled cart assembly 35 a rigid rectangular structure. The bottom frame cross member 37 mates with the mobile passenger vehicle docking fixture. Detachable support tray 42 is shown in position on support pegs 11.

Figure 6:
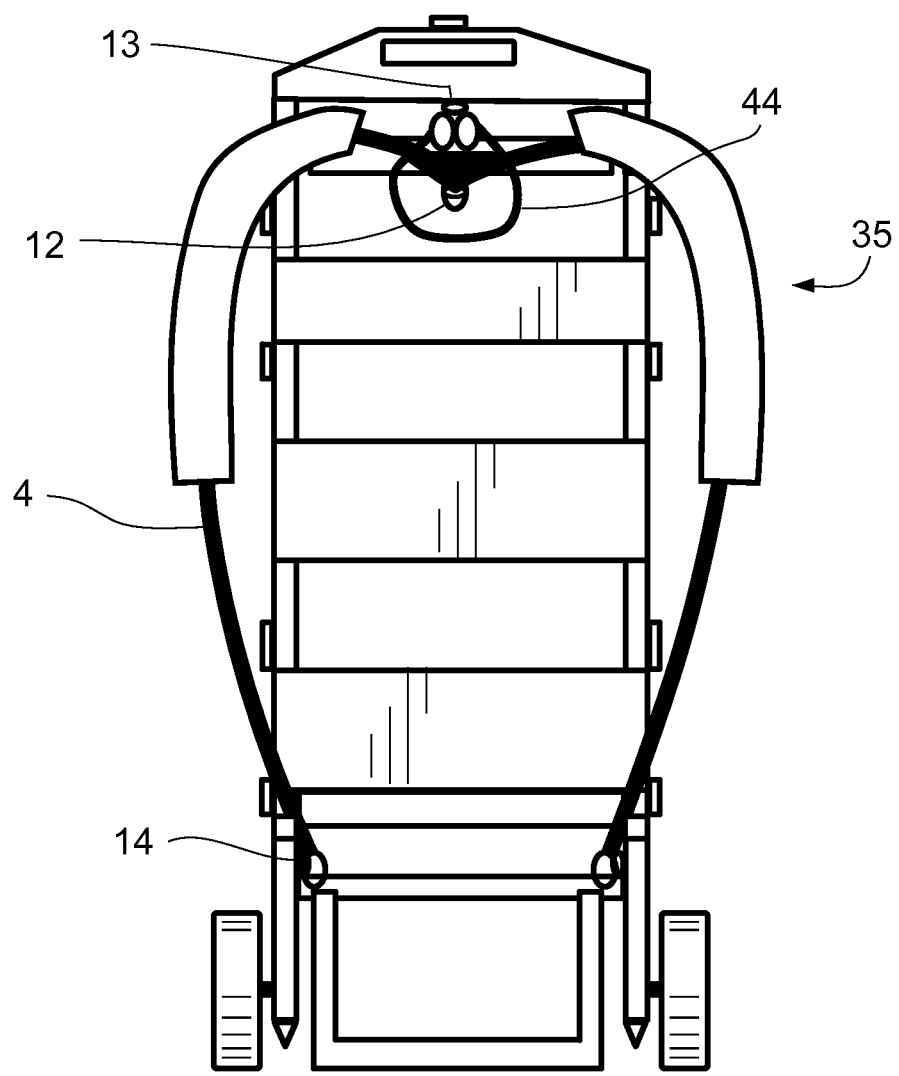
FIG. 6 is a rear elevation view of the shoulder-carriable wheeled cart assembly with the adjustable backpack harness straps and retractable cord attached.

FIG. 6 shows the detachable adjustable backpack harness straps 4 attached to cart assembly 35 via the upper frame harness fastening ring 12 and the lower frame harness fastening rings 14. Retraction cord 44 is looped around detachable adjustable backpack harness straps 4 and attached to the telescoping handle harness fastening ring 13.

Figure 7:
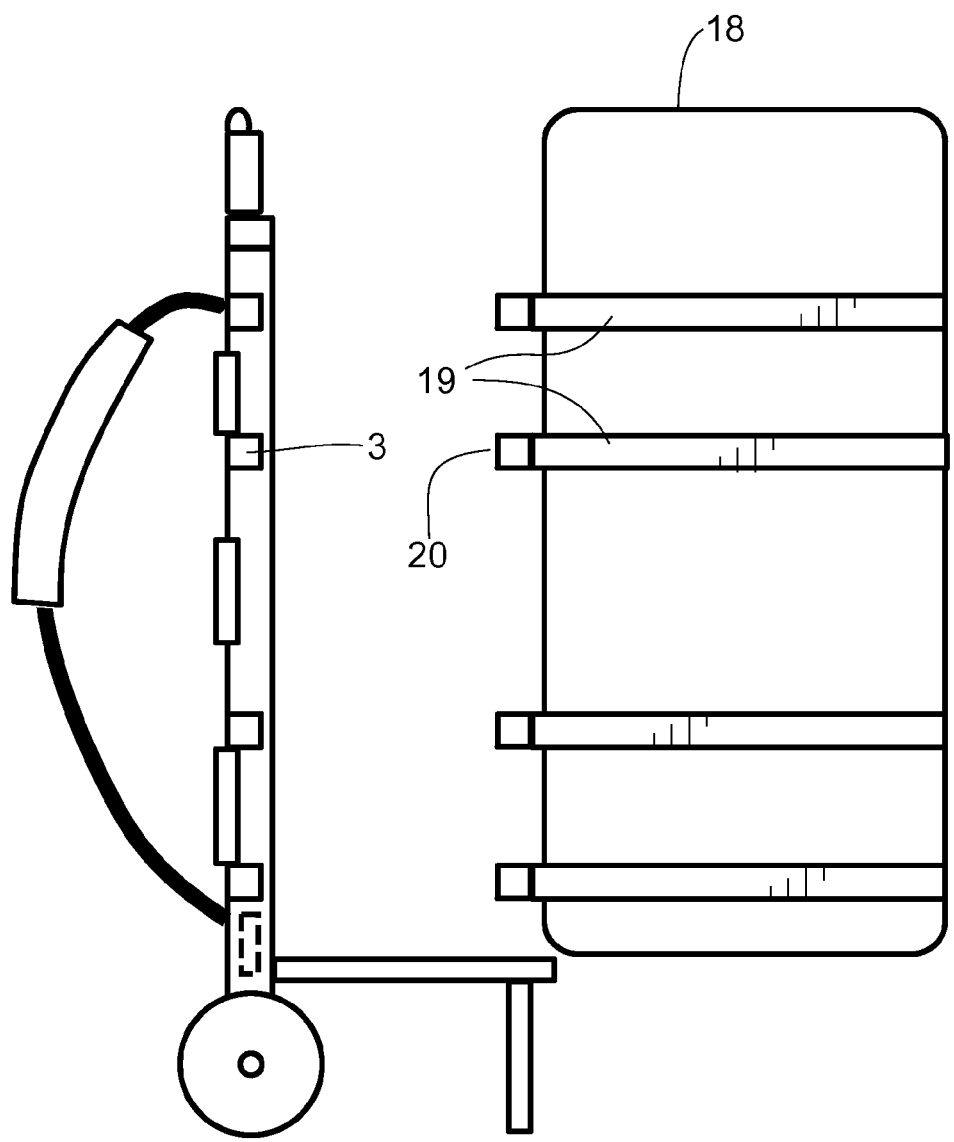
FIG. 7 is a side elevation view of the shoulder-carriable wheeled cart assembly with backpack detached.

FIG. 7 shows the addition of a backpack 18, which includes support straps 19 with bag attachment connectors 20 that mate with and connect to with bag attachment connectors 3.

Figure 8:
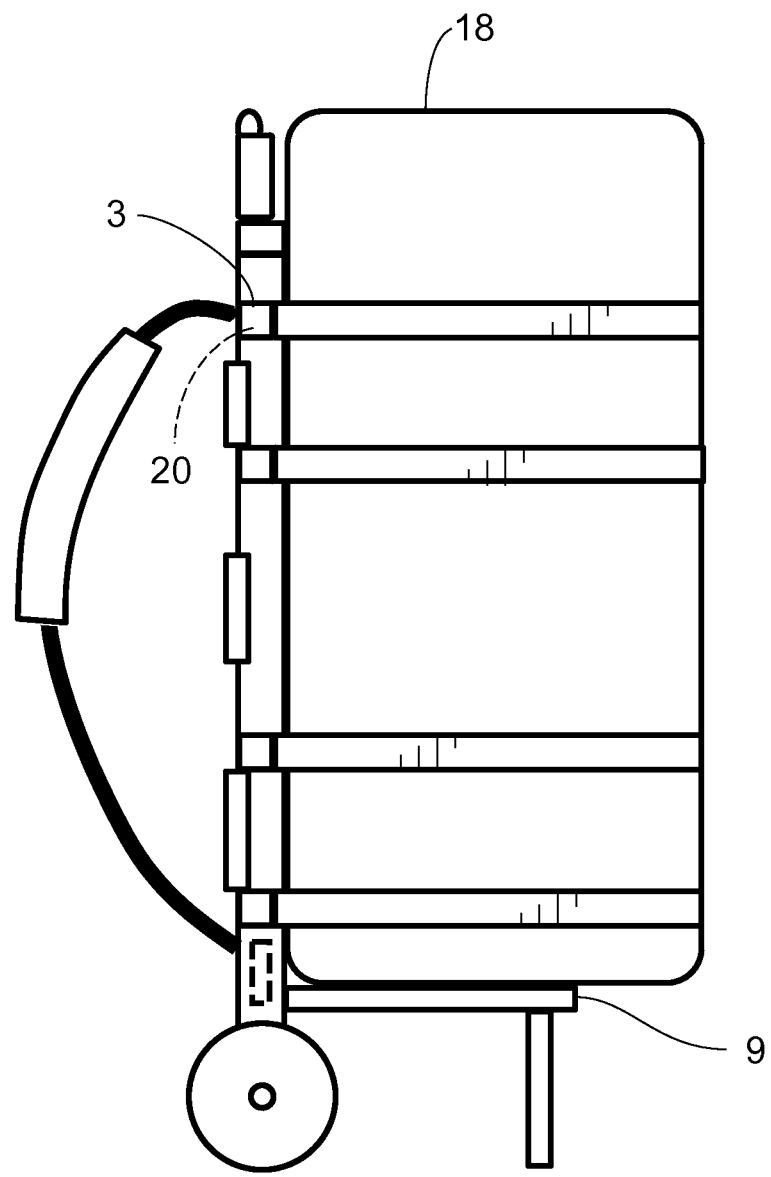
FIG. 8 is a side elevation view of the shoulder-carriable wheeled cart assembly with backpack attached.

FIG. 8 shows the mating of the bag attachment connectors 20 to the bag attachment connectors 3. Such mating positions backpack 18 on top of folding shelf member 9.

Figure 9:
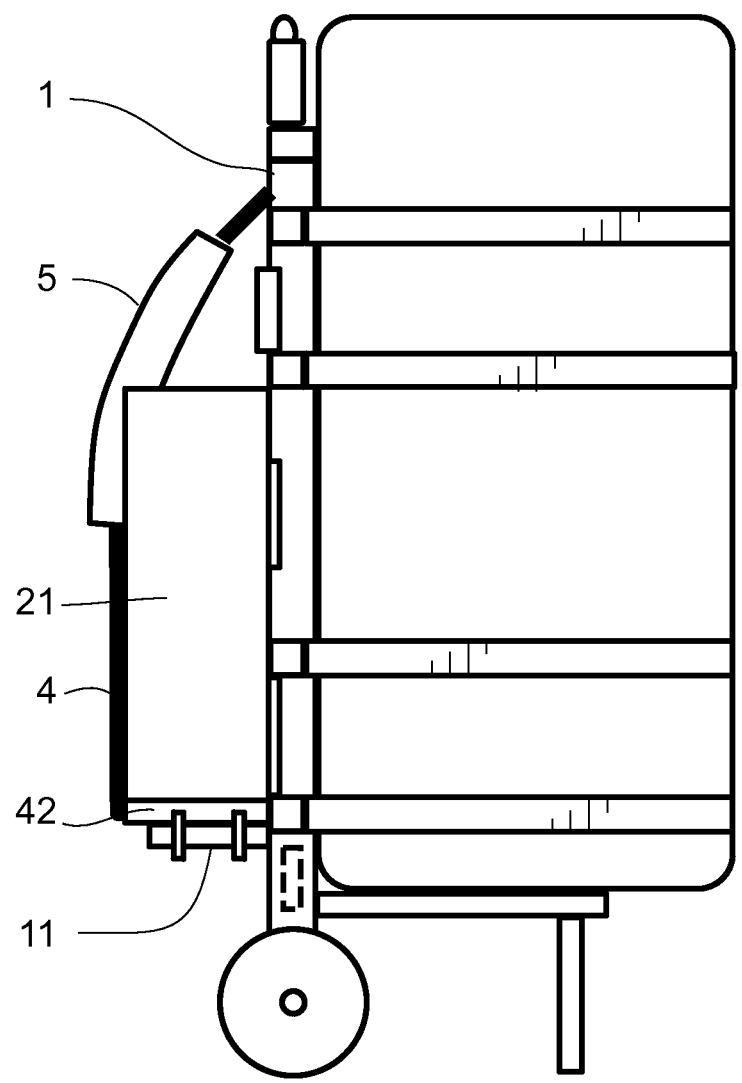
FIG. 9 is a side elevation view of the shoulder-carriable wheeled cart assembly with support peg extended, support tray attached, an article in the form of a case or carton loaded on the support tray, and adjustable backpack harness strap tightened over load.

FIG. 9 shows the addition of an article 21, in the form of a case or carton of cans or carton of snacks or the like. As shown, article 21 sits upon detachable support tray 42 that bridges across support pegs 11. Harness straps 4 and padding 5 are positioned over article 21, and when adjusted to a tightened position as shown, secure article 21 on top of support tray 42 and against the back of frame 1. If article 21 is sufficiently rigid, pegs 11 alone could potentially support the weight of article 21 without the additional presence of support tray 42.

Figure 10:
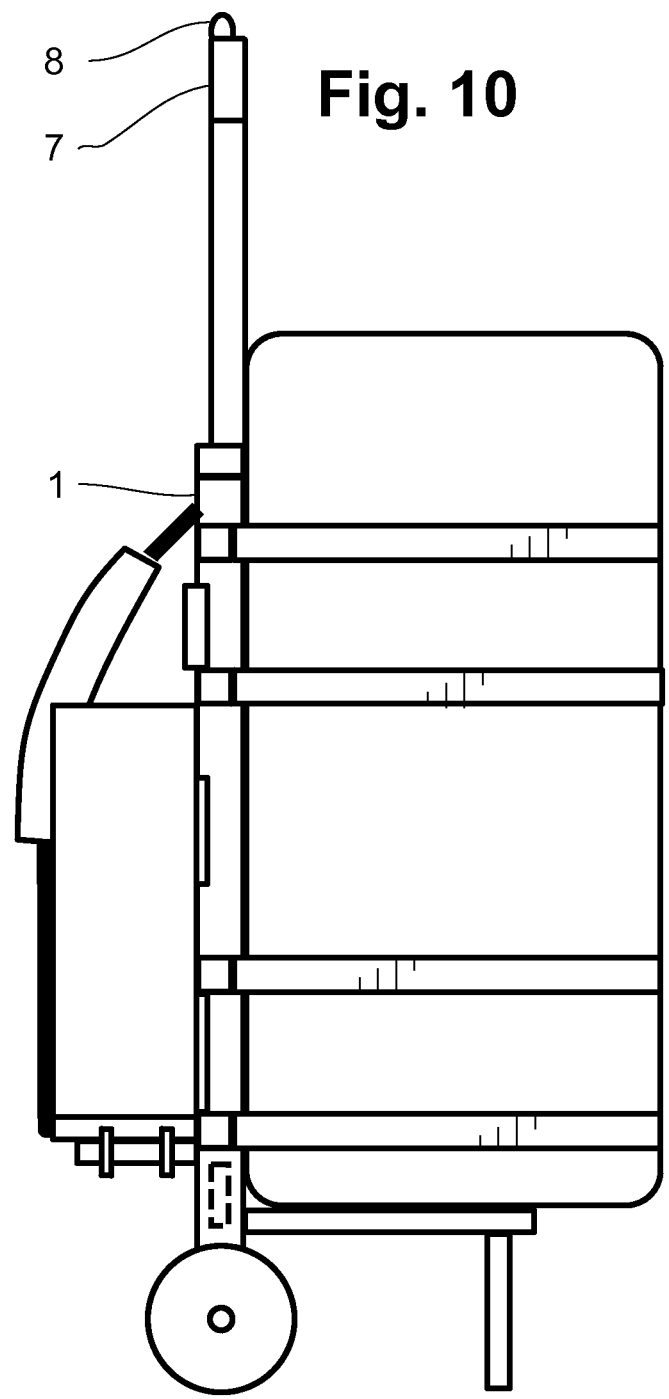
FIG. 10 is a side elevation view of the shoulder-carriable wheeled cart assembly of FIG. 6 with the telescoping handle extended.

FIG. 10 shows telescoping handle 7 in an open or extended position. Pushing handle release button 8 actuates the extension of telescoping handle 7.

Figure 11:
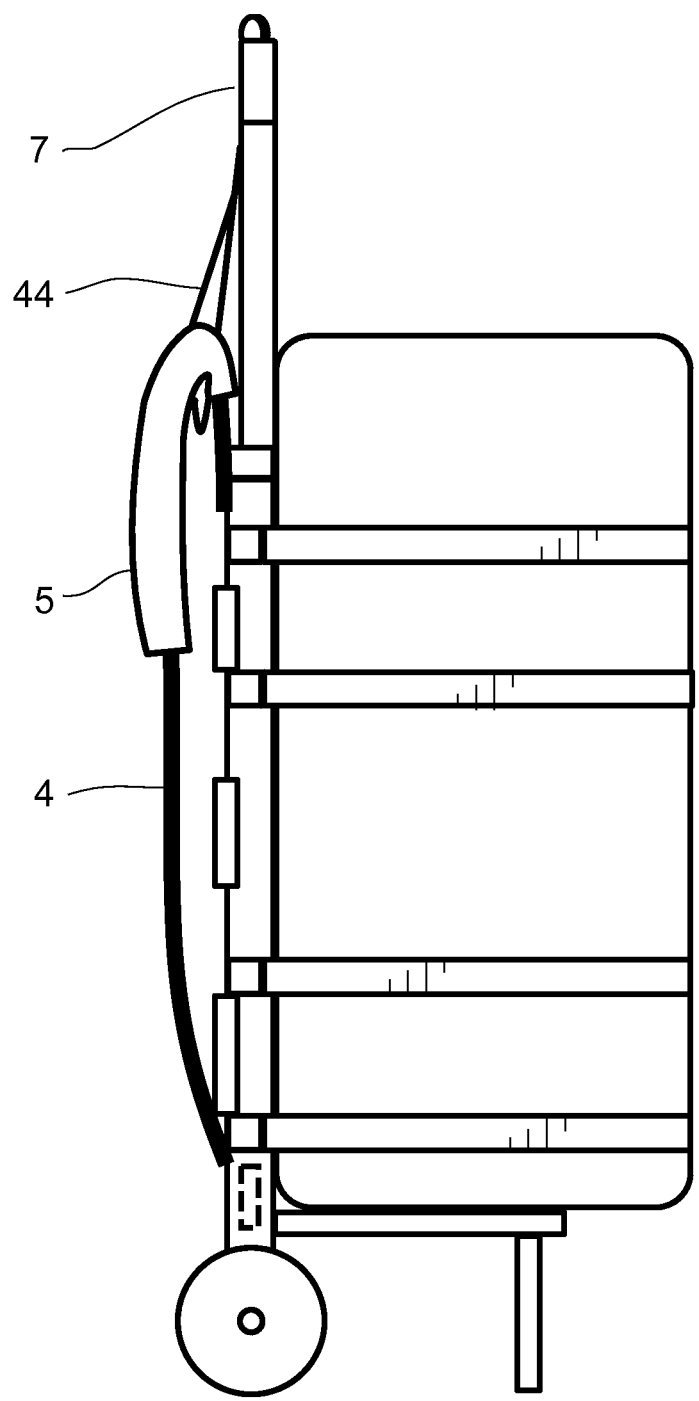
FIG. 11 is a side elevation view of the shoulder-carriable wheeled cart assembly with telescoping handle extended and retracting cord attached, without any article(s) loaded on back side of the assembly.

FIG. 11 shows cart assembly 35 with handle 7 in an open or extended position without any back-side article(s) loaded thereon. As shown in an unloaded state, retraction cord 44 applies tension on harness strap 4 and strap padding 5, thereby urging them upward so they do not drag on the ground when cart assembly 35 is rolled across a floor surface.

Figure 12:
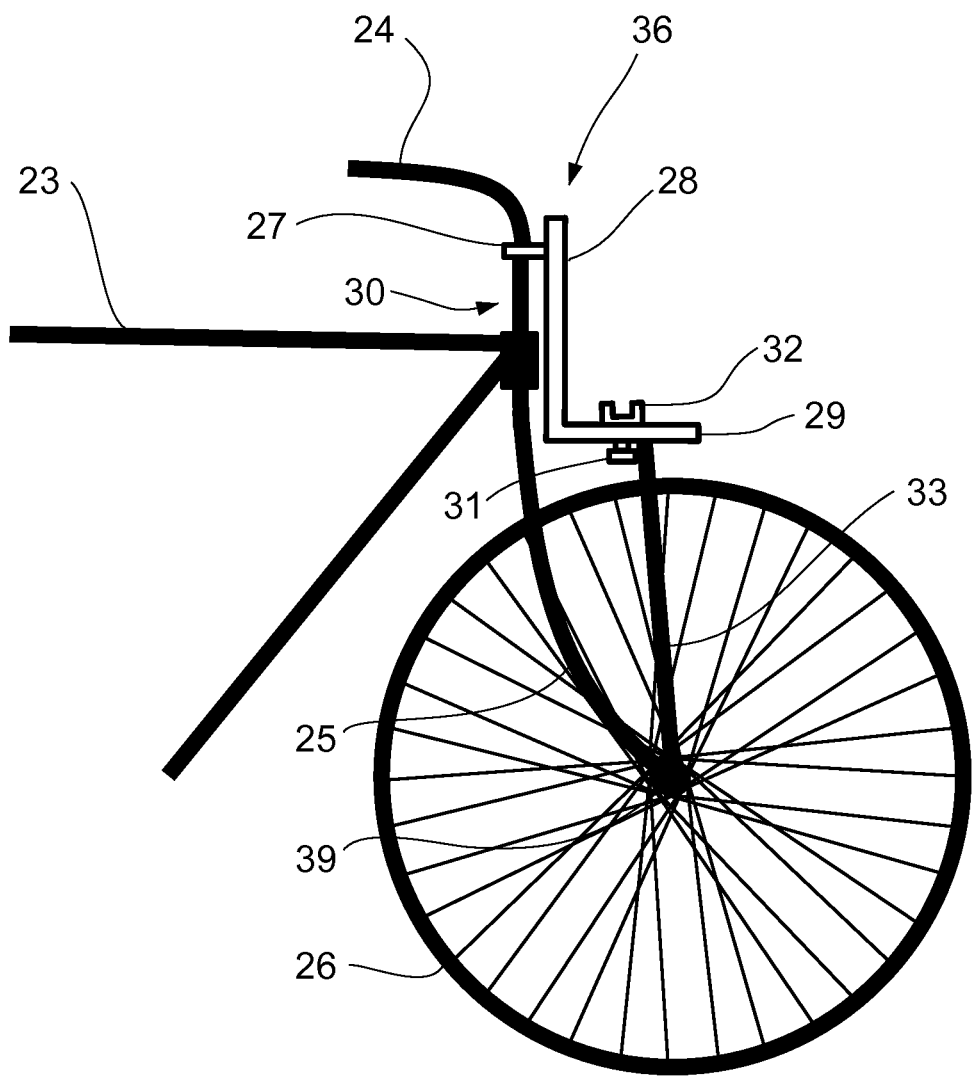
FIG. 12 is a side elevation view of the front end of a bicycle with docking fixture attached.

FIG. 12 is a side view of a mobile passenger vehicle docking fixture 36. Docking fixture 36 includes a vertical structure 28 and a bottom horizontal structure 29 rigidly attached with respect to vertical structure 28. Bottom horizontal structure 29 has a receptacle bar 32 with a U-shaped channel. Receptacle bar 32 is adjustably mounted upon it fastened by knob screws 31.

Connection of the mobile passenger vehicle docking fixture 36 to the bicycle is achieved via the handle bar fastening connector 27, and axle mounting support leg 33. Handle bar fastening connector 27 can easily be adapted for attachment to the handle bar stem 30 instead of handle bars. The mobile passenger vehicle docking fixture 36 is shown attached to a bicycle front-end assembly including bicycle frame 23, handle bars 24, front fork 25, front wheel 26, and bicycle wheel axle 39.

Figure 13:
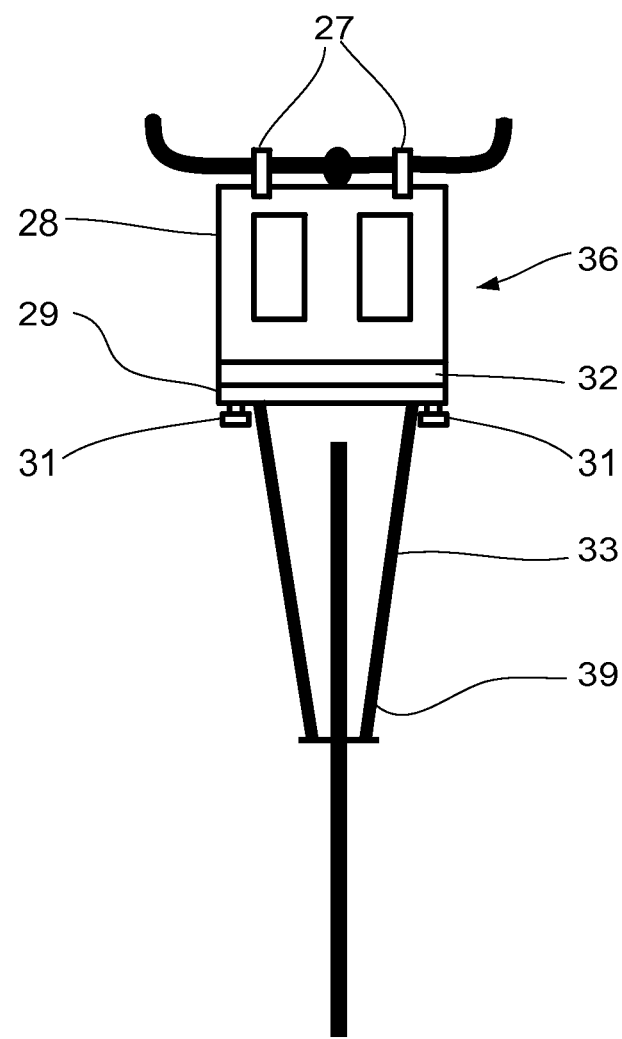
FIG. 13 is a front view of the front end of a bicycle with docking fixture and receptacle bar with U-shaped channel attached.

FIG. 13 is a front view of docking fixture 36 attached to the front end of a bicycle via handle bar fastening connector 27, and axle mounting support leg 33 mounted on bicycle wheel axle 39. Docking fixture vertical structure 28 and bottom horizontal structure 29 are shown along with receptacle bar 32 adjustably mounted to bottom horizontal structure 29 via knob screws 31.

Figure 14:
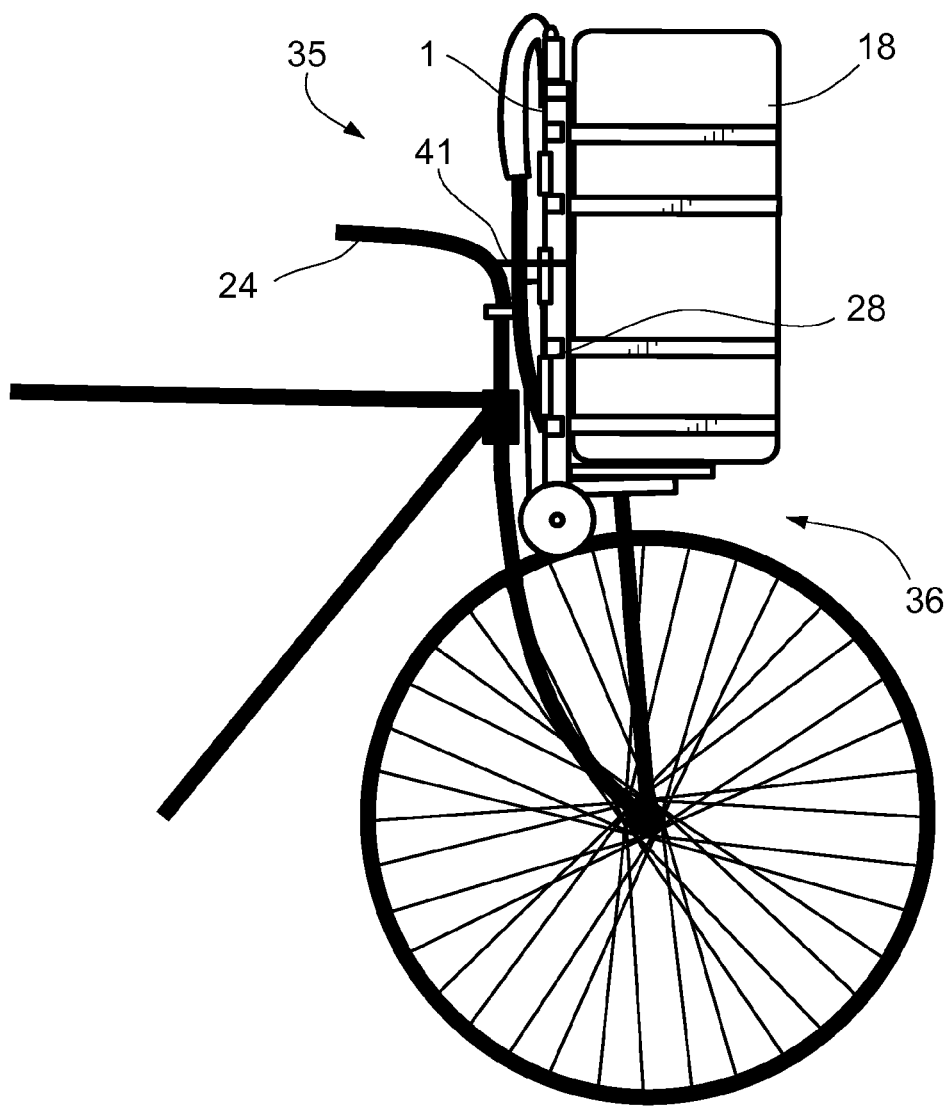
FIG. 14 is a side elevation view of the front end of a bicycle with docking fixture attached and shoulder-carriable wheeled cart assembly with backpack attached to the docking fixture.
Figure 15A:
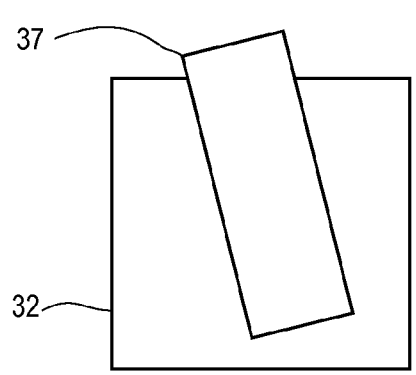
FIGS. 15A, 15B, 15C, and 15D are side elevation sectional views of different cross sectional shaped wheeled cart frame bottom cross members inserted into "U" channel shaped docking fixture receptacle bars.
Figure 15B:
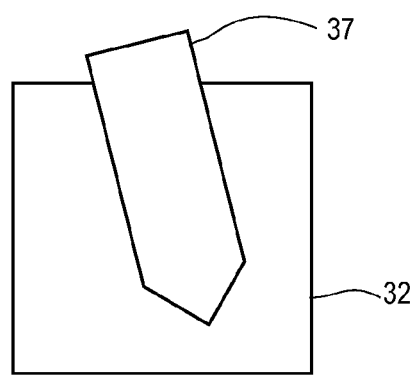
Figure 15C:
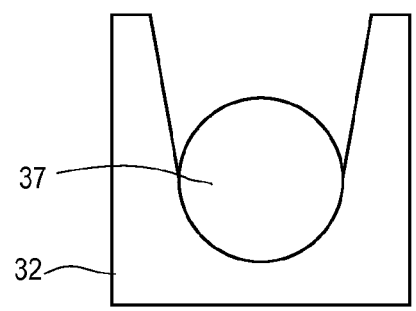
Figure 15D:
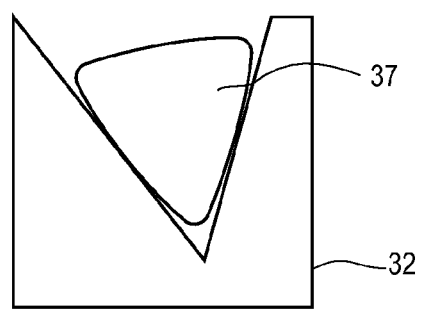

FIG. 14 shows the addition of cart assembly 35 with attached backpack 18 positioned on docking fixture 36. When in this position, wheeled frame bottom cross member 37 is inserted into the slot in docking fixture receptacle bar 32 and secured via latching device. Retraction cord 41 wraps around the upper end portion of frame 1 and handle bars 24, thereby securing the frame 1 against vertical structure 28. This prevents cart assembly 35 from shifting forward or sideways during stopping or turning motions.

FIGS. 15A through 15D shows the side sectional cut away view of different shaped wheeled cart frame bottom cross members 37 inserted into receiving slot in docking fixture receptacle bar 32. Shapes of bottom cross member 37 include rectangular in FIG. 15A, pointed end in FIG. 15B, 6 to 10 side polygon or round in FIG. 15C, and trilobal in FIG. 15D. As shown, a slight angle or lean can be incorporated in the receptacle bar slot to aid in leaning bottom cross member 37 and respective cart assembly 35 backwards against vertical structure 28.

Figure 16A:
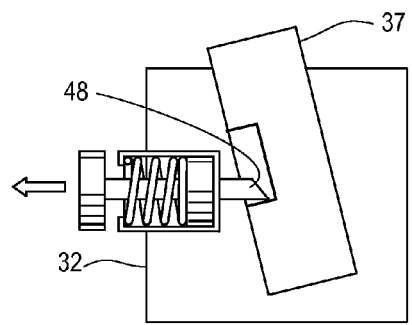
FIGS. 16A, 16B. 16C, 16D, and 16E are side elevation sectional views of different attachment and locking mechanisms and methods for securing the wheeled cart frame bottom cross member into the "U" channel shaped docking fixture receptacle bar.
Figure 16B:
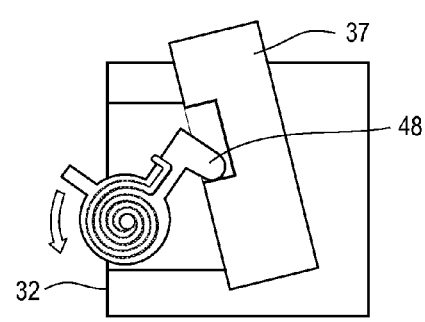
Figure 16C:
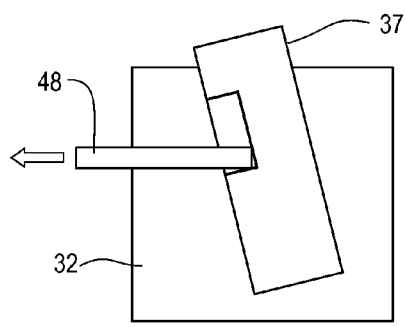
Figure 16D:
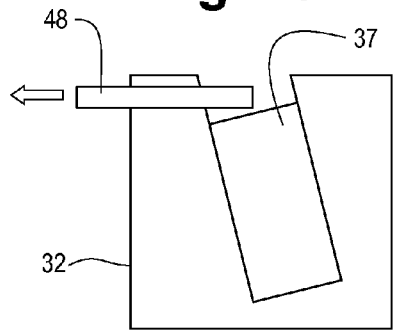
Figure 16E:
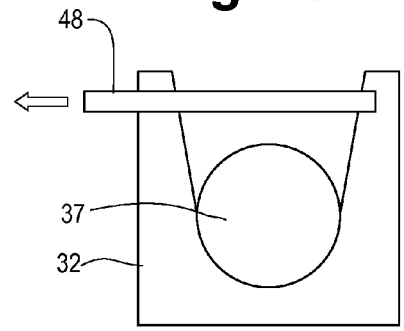

FIGS. 16A through 16E shows side cross-sectional views of different mechanical methods to releasable latch or secure the bottom cross member 37 into receiving slot in docking fixture receptacle bar 32. Mechanical latch pin 48 releasable engages bottom cross member 37 via spring tension latch or mechanical throw lever latch and secures the bottom cross member 37 within docking fixture receptacle bar 32. FIG. 16A shows a releasable spring activated lever, FIG. 16B shows a releasable spring activated lever, FIG. 16C shows a releasable mechanically thrown lever, FIG. 16D shows a releasable partial blocking lever, and FIG. 16E shows a releasable full blocking lever.

Figure 17A:
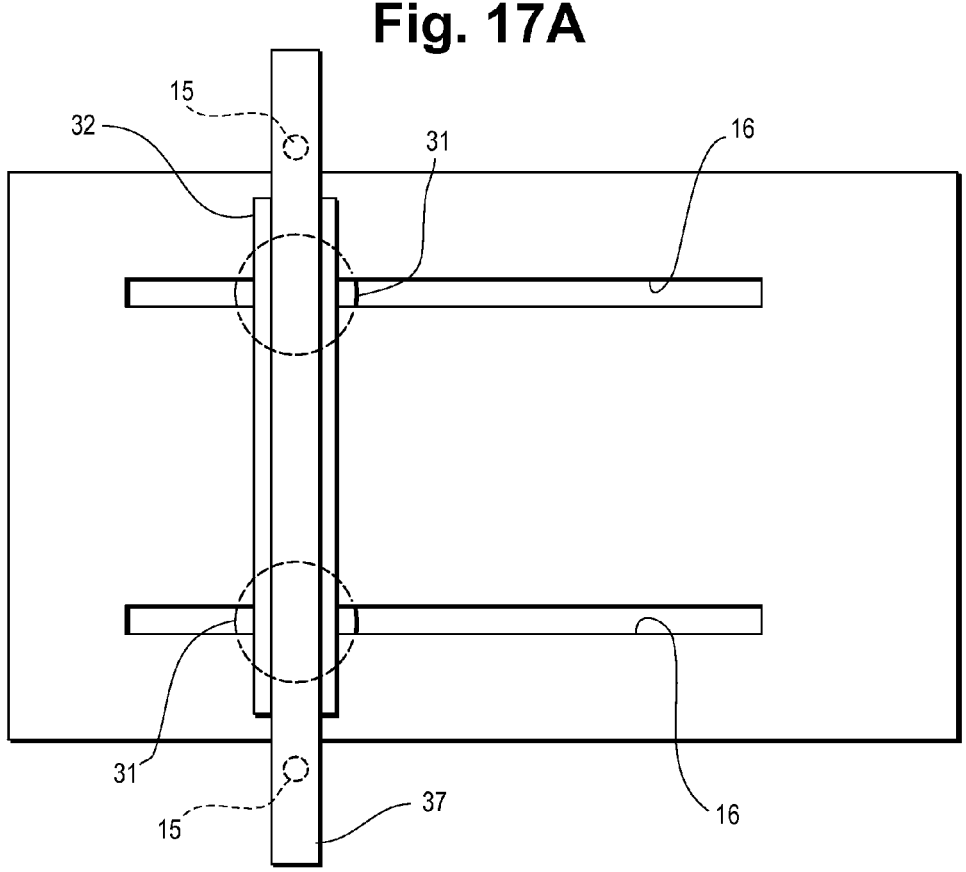
FIGS. 17A and 17B are top and side elevation views of the "U" channel shaped receptacle bar being adjustably mounted to the bottom horizontal structure of the docking fixture.
Figure 17B:
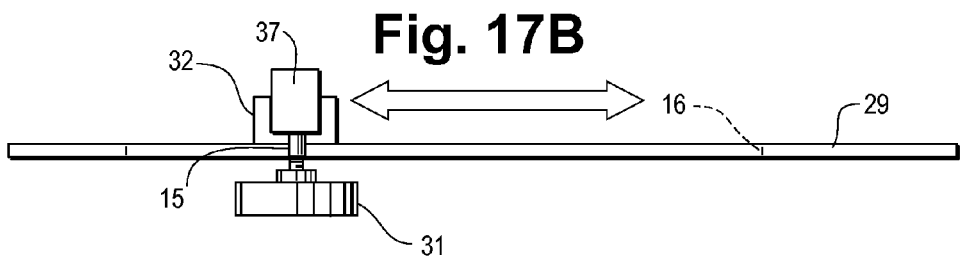

FIGS. 17A and 17B shows top and side views depicting how the docking station receptacle bar 32 is adjustably attached to the top surface of docking fixture bottom horizontal structure 29. Knob screw 31 insert through open slots 16 in docking fixture bottom horizontal structure 29 and screw into the bottom of docking fixture receptacle bar 32.

Figure 18:
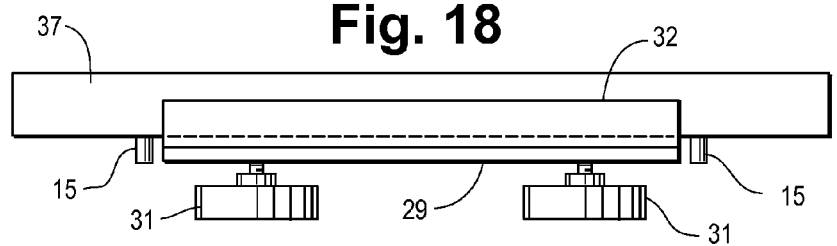
FIG. 18 is a front elevation of the bottom horizontal structure of the docking fixture with adjustable "U" channel shaped receptacle bar attached, cart frame bottom cross member inserted within receptacle bar slot, and stop pegs mounted to cart frame bottom cross member bottom surface limiting side to side motion within receptacle bar.

FIG. 18 shows a front view of the docking fixture with docking fixture receptacle bar 32 secured to docking fixture bottom horizontal structure 29 via knob screw 31. Wheeled cart frame bottom cross member 37 is inserted into the receiving slot within docking fixture receptacle bar 32. Stop pegs 15 are mounted to the bottom surface of the wheeled cart frame bottom cross member 37 to center locate bottom cross member 37 upon receptacle bar 32. Stop pegs 15 also stop lateral movement of bottom cross member 37 within slot of docking fixture receptacle bar 32 by providing blocking interference stopping lateral movement.

Figure 19:
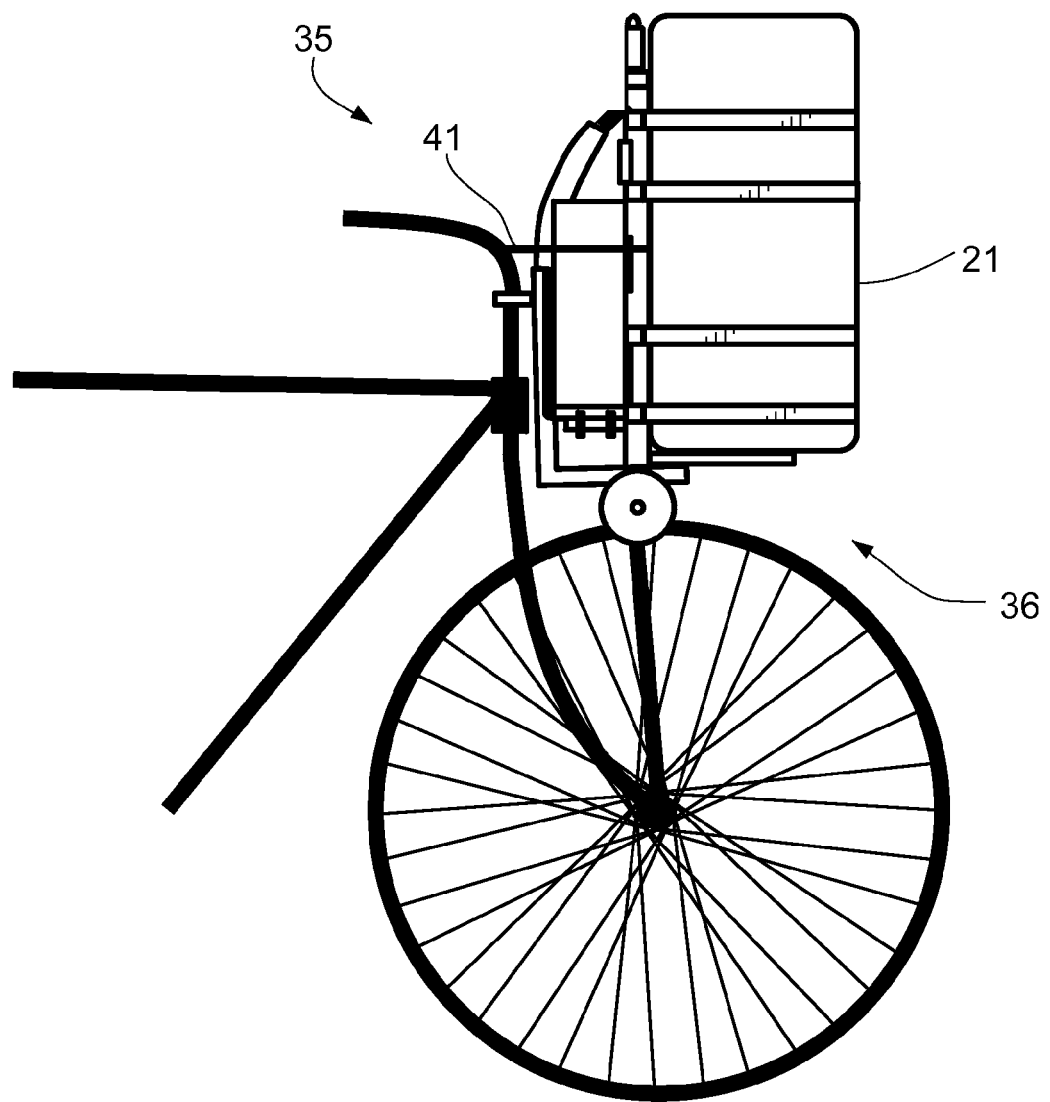
FIG. 19 is a side elevation view of the front end of a bicycle with docking fixture attached and shoulder-carriable wheeled cart assembly with attached backpack and article in the form of a case or carton loaded on the back side of the assembly.

FIG. 19 shows an article 21 secured to the back side of cart assembly 35, and cart assembly 35 mounted on docking fixture 36 attached to a bicycle. Because of the added size of article 21, the docking station receptacle bar 32 can be adjusted forward on the docking station bottom horizontal structure 29 to give more clearance room between the loaded back side of cart assembly 35 and docking fixture vertical structure 28. Cart assembly 35 is thus positioned further forward on docking fixture 36, thereby providing clearance room for article 21. Retraction cord 41 limits forward and side motion of cart assembly 35.

While particular elements, embodiments and applications of the present invention have been shown and described, it will be understood, that the invention is not limited thereto since modifications can be made by those skilled in the art without departing from the scope of the present disclosure, particularly in light of the foregoing teachings.

What is claimed is:

1. A shoulder-carriable wheeled cart assembly comprising:
   (a) a cart frame having an upper end portion and a lower end portion, said frame lower end portion having a pair of wheels mounted thereon and a foldable shelf member extendable laterally from one side thereof, said cart frame having arranged thereon a plurality of spaced first cooperative attachment members;
   (b) a detachable backpack mountable on said one side of said cart frame, said backpack having an interior storage volume and an exterior surface, said exterior surface having arranged thereon a plurality of spaced second cooperative attachment members, each of said second cooperative attachment members aligned with, attachable to and detachable from a corresponding first cooperative attachment member on said cart frame, said backpack supportable on said shelf member when said shelf member is in a laterally extended position;
   (c) a plurality of laterally spaced support pegs mounted on said cart frame lower end portion, said support pegs extending away from the other side of said cart frame,
   (d) a detachable harness strap extending from the other side of said cart frame, said harness strap having an upper end and a lower end, said harness strap upper end attachable to and detachable from said cart frame upper end portion, said harness strap lower end attachable to and detachable from said cart frame lower end portion, said harness strap tightenable about articles mounted on said support pegs between said harness strap and said cart frame to secure said articles against said cart frame other side.

2. The assembly of claim 1, further comprising a second detachable harness strap extending from said cart frame, said second harness strap having an upper end and a lower end, said second harness strap upper end attachable to and detachable from said cart frame upper end portion, said second harness strap lower end attachable to and detachable from said cart frame lower end portion, said second harness strap tightenable about articles mounted on said support pegs between said second harness strap and said cart frame to secure said articles against said cart frame other side.

3. The assembly of claim 1, wherein said wheels are detachably mounted on said cart frame.

4. The assembly of claim 1, wherein said wheels are foldably mounted on said cart frame.

5. The assembly of claim 1, wherein said support pegs are detachably mounted on said cart frame lower end portion.

6. The assembly of claim 1, wherein said support pegs are foldably mounted on said cart frame lower end portion.

7. The assembly of claim 1, further comprising a support tray attachable to said support pegs and interposable between said articles and said support pegs, whereby said support tray stabilizes the mounting of said articles on said support pegs.

8. The assembly of claim 7, wherein said support tray has a plurality of channels formed therein, each of said channels aligned with, attachable to and detachable from a corresponding support peg.

9. The assembly of claim 8, wherein said handle is extensible and said assembly further comprises a retraction cord having a first portion attached to said extensible handle and a second portion operatively connected to said strap upper end, whereby said retraction cord urges said strap upper end toward said extensible handle.

10. The assembly of claim 1, wherein said cooperative attachment members snap together.

11. The assembly of claim 1, further comprising a foldable foot member extendable downwardly from said shelf member.

12. The assembly of claim 2, wherein said harness straps converge at said strap upper ends to form a unitary strap portion, said unitary strap portion attachable to and detachable from said cart frame upper end portion, said strap lower ends attachable to and detachable from said cart frame lower end portion.

13. The assembly of claim 1, wherein said cart frame lower end portion is connectable to a docking station mounted on a mobile passenger vehicle.

* * * * *